United States Patent [19]

Kessler

[11] Patent Number: 4,712,936
[45] Date of Patent: Dec. 15, 1987

[54] ONE-PIECE CAP AND BRUSH AND METHOD OF FORMING IT

[76] Inventor: Milton Kessler, 6690 Harrington Ave., Youngstown, Ohio 44512

[21] Appl. No.: 478,051

[22] Filed: Mar. 23, 1983

Related U.S. Application Data

[63] Continuation-in-part of Ser. No. 277,843, Jun. 26, 1981, abandoned.

[51] Int. Cl.$^4$ ............................................. A46B 11/00
[52] U.S. Cl. ...................................... 401/129; 300/21; 401/126; 425/805
[58] Field of Search .................. 401/126, 129; 300/21; 425/805

[56] References Cited

U.S. PATENT DOCUMENTS

| | | |
|---|---|---|
| 2,011,545 | 8/1935 | Thorp . |
| 2,210,766 | 8/1940 | McGinnis et al. . |
| 2,558,334 | 6/1951 | Baumgartner . |
| 2,582,721 | 1/1952 | Roshkind . |
| 2,681,463 | 6/1954 | Gordon . |
| 2,904,837 | 9/1959 | Crabble . |
| 2,990,076 | 6/1961 | Stull . |
| 3,087,191 | 4/1963 | Plunkett . |
| 3,311,941 | 4/1967 | Buchwalter et al. . |
| 3,325,576 | 6/1967 | Kessler . |
| 3,612,325 | 10/1971 | Williams . |
| 3,618,154 | 11/1971 | Muhler et al. . |
| 3,861,549 | 1/1975 | Watson et al. . |
| 3,958,944 | 5/1976 | Wong . |
| 4,126,291 | 11/1978 | Gilbert et al. . |

FOREIGN PATENT DOCUMENTS

| | | |
|---|---|---|
| 1174544 | 3/1959 | France . |
| 39591 | 6/1965 | German Democratic Rep. ................................. 401/129 |
| 718151 | 10/1966 | Italy ................................. 401/126 |
| 46-29989 | 8/1971 | Japan . |
| 362261 | 12/1931 | United Kingdom . |

*Primary Examiner*—Steven A. Bratlie
*Attorney, Agent, or Firm*—Browdy and Neimark

[57] ABSTRACT

A container closure includes a cap for sealing a container against leakage, and a brush-like pliable member for spreading contents of the container. The cap includes a top wall, an internally threaded skirt depending from perimetrical portions of the top wall, and a stem depending from a central portion of the top wall. The brush includes a paddle-shaped member or a plurality of bristles which depend below the stem for brushing the contents of the container onto a surface. The cap and the brush are formed as a one-piece structure. A method of forming the one-piece cap and brush includes the step of molding the cap using a specially configured mold which has at least three relatively movable parts for defining a mold cavity and for effecting a pop-off type of ejection of the threaded skirt from the mold once the integral cap and brush have been molded. The brush bristles can have relatively large diameters as molded, and can be elongated after molding as by stretching to reduce their diameters and to give bristles of proper pliability.

12 Claims, 12 Drawing Figures

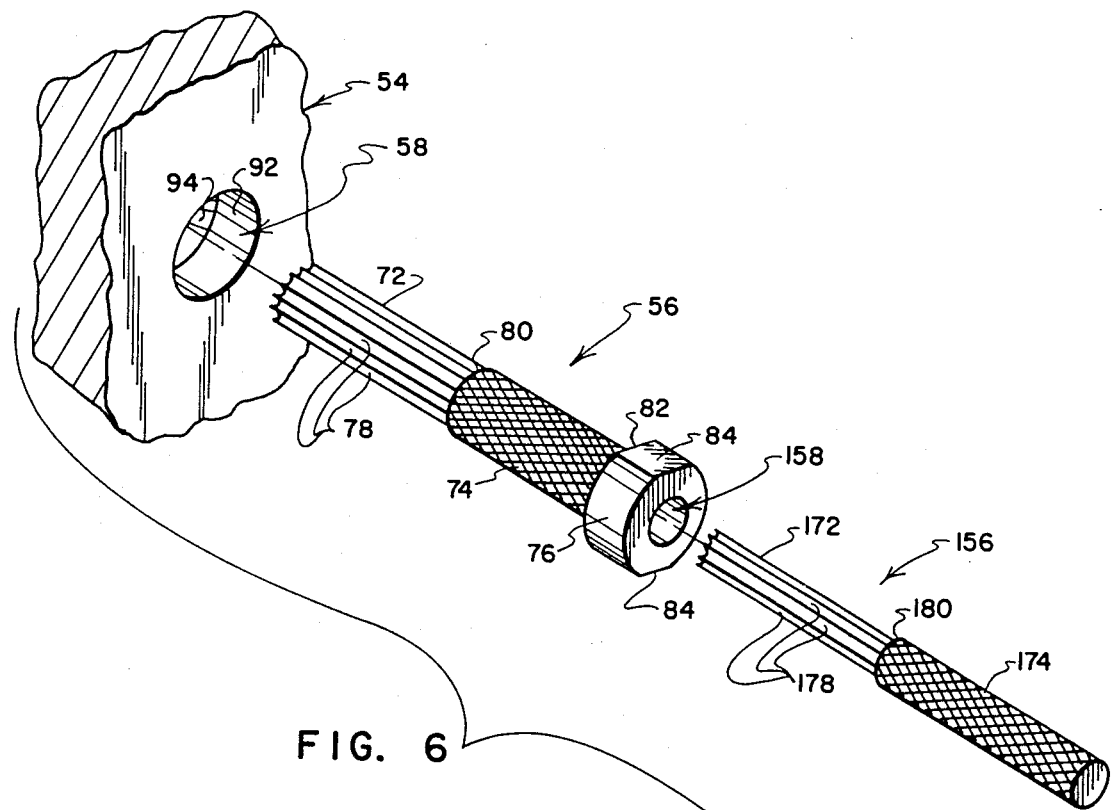
FIG. 6
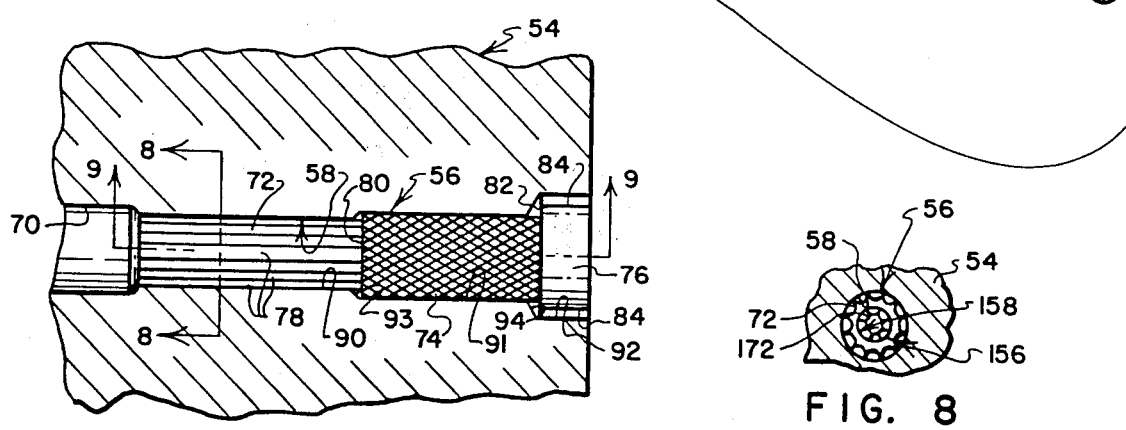
FIG. 7
FIG. 8
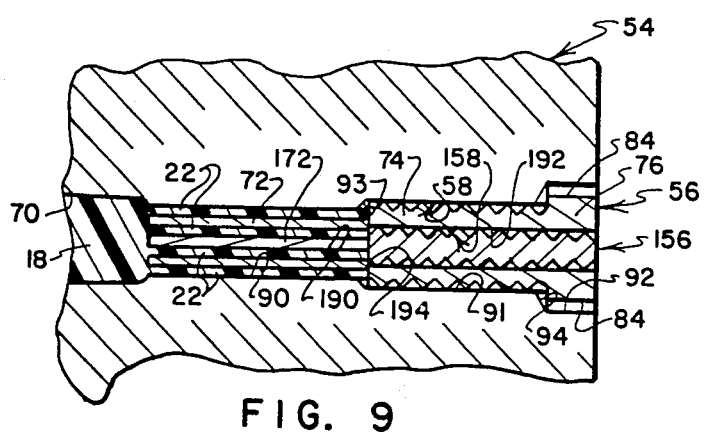
FIG. 9

4,712,936

ONE-PIECE CAP AND BRUSH AND METHOD OF FORMING IT

CROSS-REFERENCE TO RELATED APPLICATIONS AND RELEVANT PATENT

The present application is a continuation-in-part of application Ser. No. 277,843, filed June 26, 1981, entitled ONE-PIECE CAP AND BRUSH AND METHOD OF FORMING IT, hereinafter referred to as the "Parent Case," now abandoned in favor of the present application.

Reference is additionally made to the following applications and patent:

CAP AND BRUSH ASSEMBLY, Ser. No. 136,905, filed Apr. 3, 1980 by Robert J. Williams, hereinafter referred to as the "Plural-Part Cap Assembly Case," now abandoned;

CAP AND BRUSH ASSEMBLY AND METHOD OF FORMING IT, Ser. No. 478,062 filed 3/23/83 now U.S. Pat. No. 4,666,323 filed concurrently herewith by Milton Kessler as a continuation-in-part of application Ser. No. 277,840, filed June 26, 1981, entitled CAP AND BRUSH ASSEMBLY AND METHOD OF FORMING IT now U.S. Pat. No. 4,666,323, these applications being hereinafter referred to collectively as the "Cap and Brush Assembly Case," the disclosures of which are incorporated herein by reference; and, METHOD OF MAKING UNITARY PLASTIC SEALING CAP, U.S. Pat. No. 3,325,576, issued June 13, 1967, to Milton Kessler, hereinafter referred to as the "Pop-Off Molding Method Patent," the disclosure of which is incorporated herein by reference.

BACKGROUND OF THE INVENTION

1. Field of the Invention

The present invention relates to container closures having a capability for spreading contents of the container and, more particularly, to a container closure having a cap and a brush formed as a single unitary member, and to a method of forming a one-piece cap and brush.

2. Prior Art

Various types of container closures suitable for sealing container contents against leakage and having a brush secured thereto for spreading container contents are known. Substances such as rubber cement, certain types of ink, correction fluid for covering typing errors, and the like are particularly useful when the caps which seal their containers carry brushes for distributing the substances.

Most prior proposals for cap and brush assemblies have called for the stem of the brush to be formed as a part which is separate from the cap. Forming a brush stem separately from a cap and then assembling these parts as by gluing, welding, pressing or other known connection techniques have added significantly to the cost of cap and brush assemblies. Another problem associated with two-piece cap and stem structures has been the tendency of the stem to separate from the cap when the stem and brush are being pulled out of a bottle wherein the liquid contained within the bottle has set-up slightly or otherwise increased in viscosity.

The referenced Plural-Part Cap Assembly Case discloses such a two-piece arrangement. While the type of connection disclosed therein represents a significant advance in providing a cap and brush assembly with a secure connection between a cap and a brush stem, the cost of separately forming cap and brush stem components, and the cost of assembling these components in accordance with this proposal is still higher than desired.

To the degree that proposals have been made for forming a cap and an elongate applicator as an integral structure, the types of structures which have been proposed have been suitable for formation only with an unscrewing type mold which includes a complex assembly of parts for threading a molded cap and applicator structure off of the mold once the molded structure has been formed. Limitations imposed on the configurations of such structures as can be molded where there is a need to unscrew the resulting molded structures from the mold have not permitted a desirable type of integral cap and applicator to be formed. Moreover, unscrewing-type molds are undesirable from the viewpoint of their excessively high cost.

3. The Cap and Brush Assembly Case

The referenced Cap and Brush Assembly Case relates to a one-piece cap and brush stem construction to which brush bristles are secured in order to complete the formation of a cap and brush assembly. The one-piece cap and brush stem structure assures that the brush stem does not separate from the remainder of the cap, as is commonplace with many two-piece cap and brush stem assemblies. At the time the invention of the Cap and Brush Assembly Patent was conceived, it was not appreciated that brush bristles could be formed integrally with a one-piece cap and stem structure.

SUMMARY OF THE INVENTION

The present invention addresses the foregoing and other drawbacks of the prior art, and provides a novel and improved container closure suitable for sealing a container against leakage and having a one-piece construction which includes an integrally formed brush stem which carries an integrally formed paddle or brush bristles to spread container contents. The one-piece cap and brush construction has desirable qualities of minimal manufacturing expense, elimination of assembly steps, and strength of construction.

A further feature of the invention lies in the provision of a method for forming a one-piece cap and brush structure. Prior to the present invention and to the invention described in the referenced Cap and Brush Assembly Patent, it had long been agreed by those skilled in the art to which the present invention pertains that the only reasonable method of forming cap and brush structure of the type used with typewriter correction fluid containers was to (1) form the cap separately from the brush stem, (2) form the brush bristles separately from the brush stem, and (3) assemble the cap, the brush stem and the bristles The present invention has proven prior thinking to have been in error.

The method of the present invention utilizes features of a pop-off molding technique which is described in the referenced Pop-Off Molding Method Patent. The referenced patent describes the use of either or both of an extensible rim-engaging ejector sleeve and an extensible center ram, which extensible parts are relatively movable with respect to other parts of a mold to effect a pop-off type of removal or ejection of a molded cap from its mold. The method of the present invention preferably utilizes one or both of these types of relatively extensible mold parts to effect removal or ejection of an integrally formed cap and brush structure from its mold.

The foregoing and other features and advantages, and a fuller understanding of the invention, may be had by referring to the following description and claims, taken in conjunction with the accompanying drawings.

BRIEF DESCRIPTION OF THE DRAWINGS

FIG. 6 is an exploded perspective view, on an enlarged scale, showing portions of the mold pieces;

FIG. 7 is a sectional view showing the mold pieces of FIG. 6 in their assembled configuration;

FIGS. 8 and 9 are sectional views as seen from planes indicated by lines 8—8 and 9—9 in FIG. 7, with FIG. 9 also including a showing of stem and bristle portions of a cap and brush structure being molded;

DESCRIPTION OF THE PREFERRED EMBODIMENT

Figure 1:
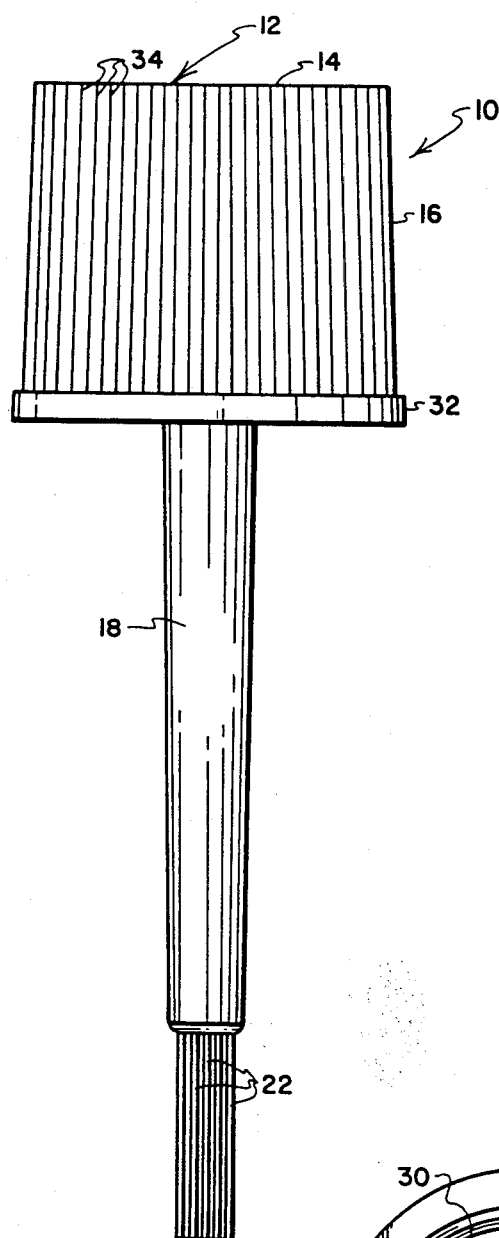
FIG. 1 is a side elevational view, on an enlarged scale, of a cap and brush structure embodying features of the present invention.
Figure 2:
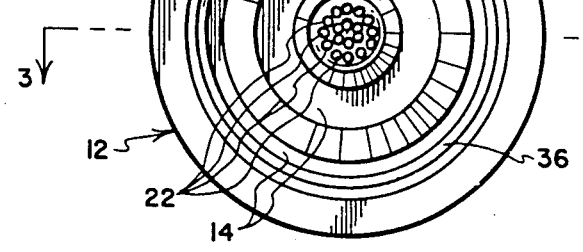
FIG. 2 is a bottom plan view of the cap and brush structure of FIG. 1.
Figure 3:
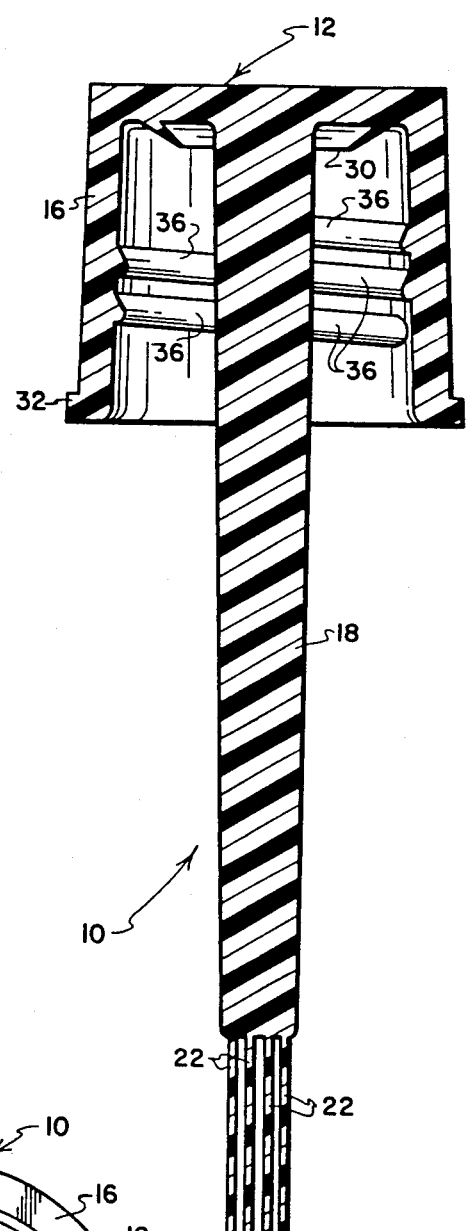
FIG. 3 is a sectional view as seen from a plane indicated by a line 3—3 in FIG. 2.

Referring to FIGS. 1-3, a one-piece cap and brush structure embodying features of the present invention is indicated generally by the numeral 10. The elements of the integral structure 10 include a top wall 14, an annular skirt 16 depending from the perimeter of the top wall 14, a thin elongate stem 18 depending from central portions of the top wall 14, and brush bristles 22 located at the lower end region of the stem 18.

The top wall 14 is of generally disc-like configuration. Referring to FIG. 3, a sealing formation 30 of relatively thin, pliable material is formed integrally with the top wall 14 and depends therefrom so as to encircle the upper end region of the stem 18. The sealing formation 30 is configured such that, when the cap assembly 10 is installed on the neck of a conventional container (not shown), the upper end of the container's neck will engage and compress the sealing formation 30 so that a secure, liquid-tight seal is formed between the cap assembly 10 and the container.

Referring to FIG. 1, the skirt 16 has a circumferential flange or rim 32 formed near its lower end, and has upwardly extending ribs 34 formed on its outer surface. The flange 32 and the ribs 34 cooperate to provide a surface which can be readily gripped by the fingers of one's hand to facilitate rotating the cap assembly 10 relative to a container on which the cap assembly 10 is installed.

Referring to FIG. 3, a plurality of helical threads 36 are formed on the inner surface of the skirt 16 and are arranged to cooperate with such threads as may be formed on an external surface of a container neck (not shown) to permit the cap assembly 10 to be tightly secured on the container neck.

The stem 18 is tapered along its length. The bristles 22 are several in number and are formed as integral extensions of the stem 18.

Figure 4:
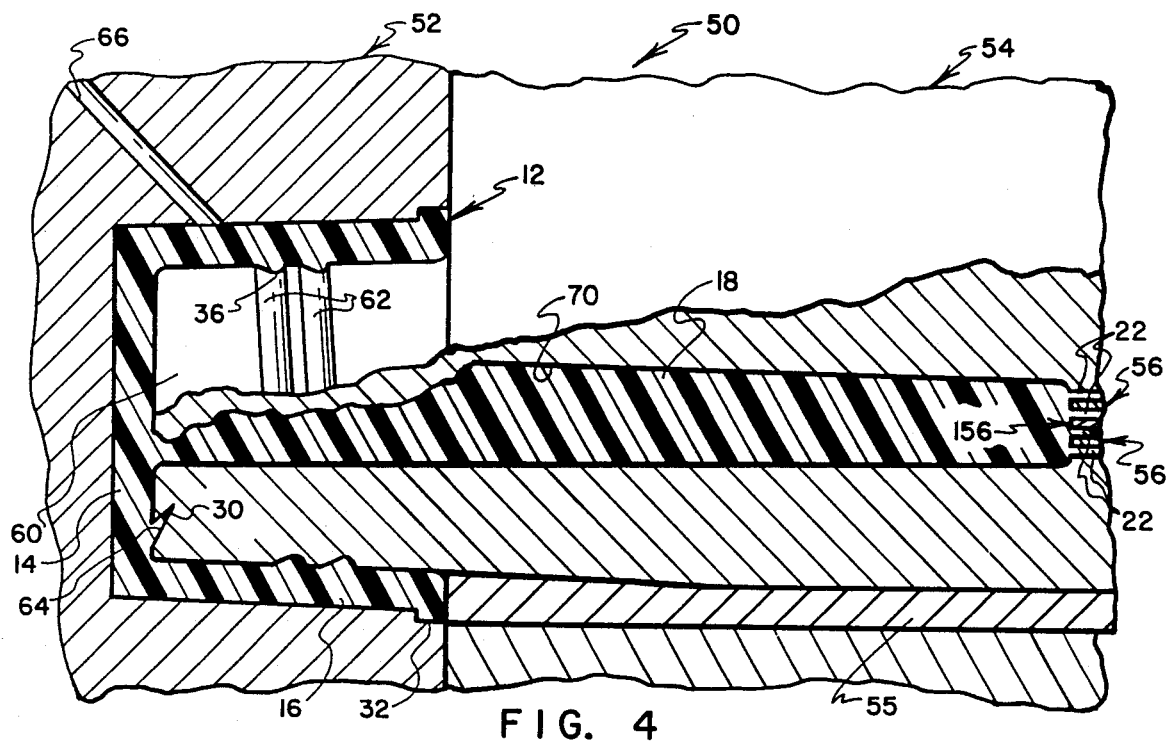
FIG. 4 is a side elevational view of portions of a plural-piece mold used to form the cap and brush structure of FIGS. 1-3, with parts of the mold pieces being broken away and shown in cross-section, and with portions of a cap and brush structure being shown in cross-section inside the cavity defined by the mold.
Figure 5:
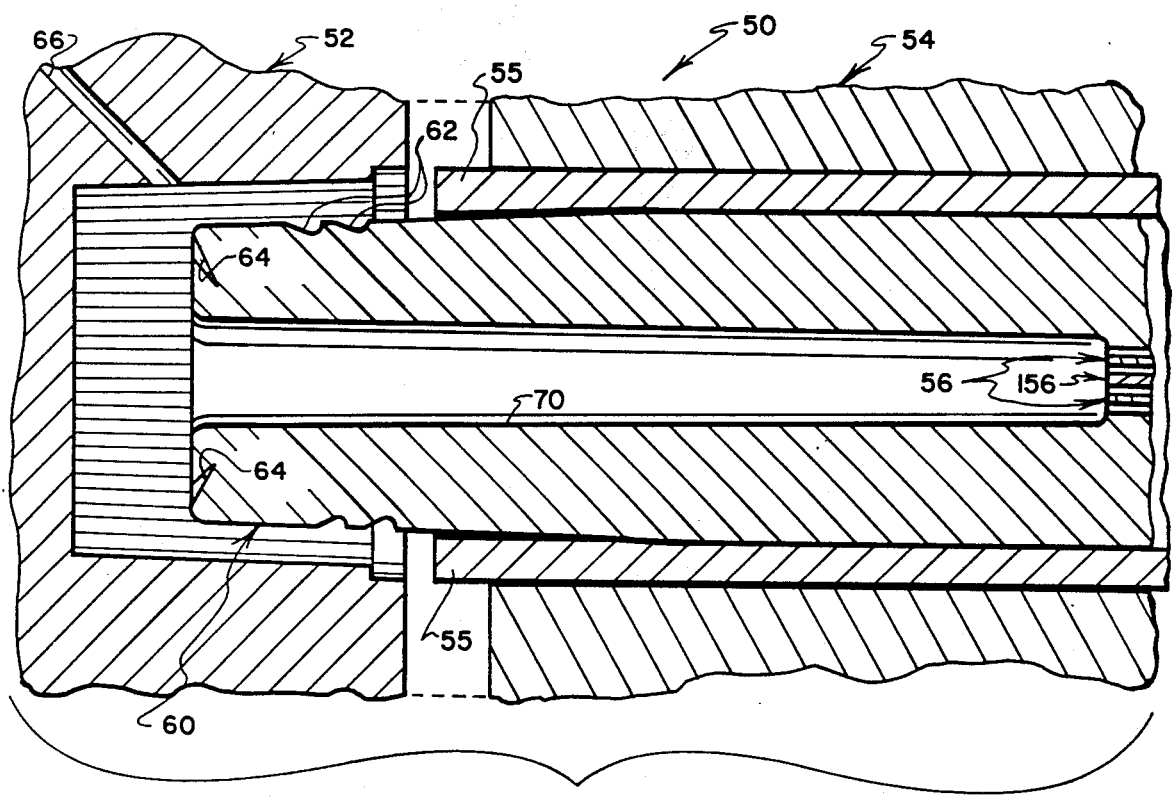
FIG. 5 is a cross-sectional view of the mold of FIG. 4 with the relatively movable pieces of the mold separated, and with an ejector sleeve moved to an extended position to illustrate how it operates to effect a pop-off type of removal of a molded cap and brush structure from the mold.

The method utilized to form the cap and brush structure 10 involves the use of a mold which is indicated generally by the numeral 50 in FIGS. 4 and 5. Referring to FIGS. 4-9, the mold 50 includes a cavity half 52, a core half 54, an ejector sleeve 55, an outer pin member 56 which is permanently pressed into a hole 58 formed in the core half 54, and an inner pin member 156 which is permanently pressed into a hole 158 formed in the outer pin member 56.

The cavity half 52 and the core half 54 cooperate to define a cavity for molding the cap's top wall 14 and skirt 16. The core half 54 has a member 60 which projects into the cavity half. Thread formations 62 are provided on the member 60 to mold the threads 36. A groove formation 64 is provided on the member 60 to mold the sealing formation 30.

The ejector sleeve 55 surrounds the member 60, as is best seen in FIG. 5, and is movable relative to the remainder of the elements of the core half 54, as illustrated in FIG. 5, to effect a pop-off type of removal or ejection of a molded cap and stem structure 12 from engagement with the core half 54 once the mold halves 52, 54 have been opened and separated following molding of a cap and stem structure 12. The use of an ejector sleeve 55 to effect a pop-off type of removal of a molded cap from a mold is described in detail in the referenced Pop-Off Molding Method Patent, the disclosure of which is incorporated herein by reference.

A tapered hole 70 extends through the core half 54 to define a cavity portion for molding the stem 18. The pin member 56 has an end portion 72 which extends into the tapered hole 70 for molding an outer ring of the bristles 22. The pin member 156 has an end portion 172 which extends into the hole 158 for molding an inner ring of the bristles 22. A gate passage 66 is formed in the cavity half 52 for introducing plastics material in a molten state into the cavity defined by the mold parts 52, 54, 55, 56, 156 for molding the cap and brush structure 10.

Referring to FIGS. 6 and 7, the outer pin 56 and the hole 58 are specially configured to provide a vent which will let gases escape from the tapered hole 70 as plastics material flows along the hole 70 and into the hole 58. Flutes or grooves 78 are formed on the outer surface of a mold portion 72 of the pin 56 to form an outer ring of the bristles 22. The outer pin 56 has radially extending shoulders 80, 82 which define transitions between mold, central and head portions 72, 74, 76 which are each of progressively larger diameter. The central portion 74 has a knurled outer surface. The head portion 76 has a pair of flats 84 formed on its opposite sides.

Referring to FIG. 7, the hole 58 is coaxial with the hole 70 and has constant diameter inner, middle and outer portions 90, 91, 92 separated by tapered portions 93, 94. The inner portion 90 has a diameter which will snugly receive the fluted mold portion 72 of the pin 56. The middle portion 91, has a diameter which will receive the knurled surface of the central portion 74 of the pin 56 in a press fit, yet which will let gases filter along the pin 56 through passages defined by the grooves of the knurled surface 74. The tapered portions 93, 94 and the shoulders 80, 82 cooperate to define a passage therebetween which permits gases to travel from the hole portion 90 through the hole portion 91 to the hole portion 92. The flats 84 enable gases to escape through the hole portion 92.

Referring to FIGS. 6, 8 and 9, the inner pin 156 and the hole 158 are specially configured to provide a vent which will assist in letting gases escape as plastics material flows along the hole 70 and into the hole 158. Flutes or grooves 178 are formed on the outer surface of a mold portion 172 of the pin 156 to form an inner ring of the bristles 22. The inner pin 156 has a radially extending shoulder 180 which defines a transition between the mold portion 172 and a mounting portion 174 of the pin 156. The mounting portion 174 is of larger diameter than the mold portion 172 and has a knurled outer surface.

Referring to FIGS. 8 and 9, the hole 158 is coaxial with the holes 70, 58, and has constant diameter inner and outer portions 190, 192 separated by a tapered portion 194. The inner portion 190 has a diameter which will snugly receive the fluted mold portion 172 of the pin 156 and cooperate therewith to form separate channels or passages within which the inner ring of bristles 72 are molded. The outer portion 192 has a diameter which will receive the knurled surface 174 of the pin 156 in a press fit, yet which will let gases escape along the pin 156 through passages defined by the grooves of the knurled surface 174. The tapered portion 194 and the shoulder 180 cooperate to define a passage therebetween which permits gases to travel from the hole portion 190 to the hole portion 192 for escape.

In operation, the mold parts 52, 54, 55, 56, 156 are positioned as shown in FIG. 4 to mold a cap and brush structure 10. Molten plastics material is injected into the mold cavity through the gate passage 66. As the plastics material fills the cavity and travels along the hole 70 to form the stem 18, and into the holes 58, 158 to form the bristles 22, such gases as may have been trapped in the holes 70, 58, 158 escape along the pins 56, 156 by virtue of the venting arrangements described previously. Once a cap and brush structure 10 has been molded, the mold halves 52, 54 are separated as shown in FIG. 5, the cap portion is ejected or "popped off" of the mold member 60 by effecting movement of the ejector sleeve 55 to engage the rim 32 of a molded cap and stem structure 12 in the manner described in the referenced Pop-Off Molding Method Patent, whereby the stem and bristles 18, 22 are pulled out of the holes 70, 58, 158.

As will be apparent from the foregoing, the present invention represents a significant step forward in the provision of a cap and brush structure of the general type used on containers of typing correction fluid. By integrally forming cap, stem and brush components, considerable savings in molding result, as does an improved product, and assembly costs are eliminated.

While the pins 56, 156 have been described, in their preferred forms, it will be understood that they can be replaced by a single pin (not shown) and/or take a variety of other configurations which will result in the formation of bristles of other configurations and/or other arrangements of bristles. Instead of forming a plurality of bristles 22, a single pin (not shown) may be used which forms a thin, flat, elongate, pliable paddle for spreading container contents.

Figure 10:
FIG. 10 is a side elevational view showing the configuration of brush bristles when they are removed from the mold.
Figure 11:
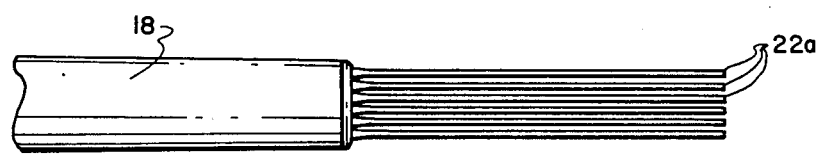
FIG. 11 is a side elevational view similar to FIG. 10 showing the configuration of brush bristles after they have been stretched to narrow their cross-sections; and, FIG. 12 is a side elevational view similar to FIG. 11 showing the configuration of brush bristles when they are cut-off after having been stretched.
Figure 12:
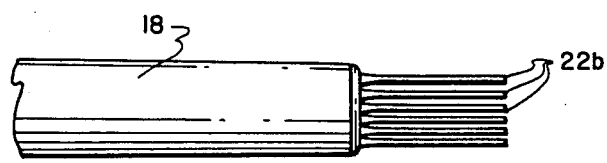

While the brush bristles 22 have been described as being formed in their final configurations, it will be understood that the bristles 22 can be reheated and elongated after the cap and brush structure 10 has been removed from the mold 50. Referring to FIG. 10, bristles 22 are shown on a stem 18 in the configuration assumed by the bristles 22 when the cap and brush structure 10 is removed from the mold 50. The bristles 22 can be reheated and stretched, as indicated by the numeral 22a in FIG. 11, to diminish their diameters, and can be trimmed to a desired length after being stretched, as indicated by the numeral 22b in FIG. 12.

While the preferred material from which the cap and brush structure 10 is formed is a plastics material such as polypropylene, other plastics materials such as polyethylene may be used.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A method of forming a one-piece internally threaded cap and brush structure for closing a container and for spreading liquid content of the container, comprising the steps of:
  (a) providing a mold having at least three relatively movable mold parts which cooperate to define a cavity configured to form a one-piece cap, stem and brush structure which includes:
    (i) a top wall;
    (ii) a skirt depending from the top wall and formed integrally therewith, the skirt having threads formed on its inner surface;
    (iii) an elongated stem depending from central portions of the top wall along a central axis of the mold cavity and formed integrally with the top wall;
    (iv) a brush formed of discrete bristles depending from the stem and formed integrally therewith; and wherein said mold includes a cavity for forming said elongate stem with a plurality of discrete bristle projections integrally extending axially therefrom;
  (b) injecting molten plastics material into the mold cavity to form the cap and brush structure;
  (c) removing the cap and brush structure from the mold cavity by effecting relative movement of the three mold parts, with two of the mold parts separating to open the mold cavity to permit removal of the cap and brush structure from the mold cavity, and with a third of the mold parts moving in a direction paralleling the central axis to engage the cap and brush structure and to pop the threaded shirt off such one of the other two mold parts as formed the threaded inner surface of the skirt; and (d) elongating the plurality of discrete bristle projections to diminish their cross-sections, the elongation being effected after the cap and brush structure is removed from the mold cavity.

2. A one-piece cap and brush structure formed by the method of claim 1.

3. The method of claim 1 wherein the step of providing a mold includes the steps of:
   (a) providing a pin-shaped member to form at least portions of the bristles; and,
   (b) providing a vent extending along at least a part of the pin-shaped member for permitting gases to escape from the mold cavity as molten plastic material enters the portion of the cavity wherein the stem and brush are formed.

4. A one-piece cap and brush structure formed by the method of claim 3.

5. The method of claim 1 wherein the step of elongating the bristles includes the steps of heating the plurality of discrete bristle projections to bring the material from which they are formed to a workable temperature which will permit the bristles to be stretched, and then stretching the bristles.

6. A one-piece cap and brush structure formed by the method of claim 5.

7. The method of claim 1 wherein the step of providing a mold includes the step of providing one of the mold parts with a first elongate passage extending along the central axis for molding the stem, and providing said one mold part with a first generally cylindrical pin-shaped member extending into the elongate passage, said first pin-shaped member defining a peripheral ring of bristle projection-forming cavities for molding at least some of said plurality of discrete bristle projections.

8. A one-piece cap and brush structure formed by the method of claim 7.

9. The method of claim 7 wherein the step of providing said one mold part with a first pin-shaped member includes the step of forming a central passageway through the first pin-shaped member and providing a second pin-shaped member extending into the second passage and having a plurality of bristle projection-forming cavities for molding other of said plurality of discrete bristle projections.

10. A one-piece cap and brush structure formed by the method of claim 9.

11. The method of claim 9 wherein the step of providing said one mold part with first and second pin-shaped members includes the steps of providing said bristle projection-forming cavities on outer surfaces of the fist and second pin-shaped members to mold generally concentric rings of said bristle projections.

12. A one-piece cap and brush structure formed by the method of claim 11.

* * * * *